United States Patent
Matsuda et al.

(10) Patent No.: US 9,435,424 B2
(45) Date of Patent: Sep. 6, 2016

(54) TRANSMISSION LUBRICATING STRUCTURE

(71) Applicant: Kawasaki Jukogyo Kabushiki Kaisha, Kobe-shi, Hyogo (JP)

(72) Inventors: Yoshiharu Matsuda, Akashi (JP); Hisatoyo Arima, Himeji (JP); Yoshinobu Tanaka, Inami-cho (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/104,957

(22) Filed: Dec. 12, 2013

(65) Prior Publication Data

US 2014/0174857 A1     Jun. 26, 2014

(30) Foreign Application Priority Data

Dec. 21, 2012   (JP) ................................ 2012-279647

(51) Int. Cl.
*F16H 57/04*  (2010.01)

(52) U.S. Cl.
CPC ....... *F16H 57/0456* (2013.01); *F16H 57/0424* (2013.01); *F16H 57/0484* (2013.01)

(58) Field of Classification Search
CPC ........................ F16H 57/0434; F16H 57/0421
USPC .................................................. 184/6.12, 26
See application file for complete search history.

(56) References Cited

U.S. PATENT DOCUMENTS

| | | | | |
|---|---|---|---|---|
| 3,006,439 A | * | 10/1961 | Molinaro ..................... | 184/6.12 |
| 3,738,452 A | * | 6/1973 | Hausinger .................... | 184/6.12 |
| 4,429,587 A | * | 2/1984 | Finn et al. ..................... | 74/467 |
| 5,099,715 A | * | 3/1992 | Baiker ............................. | 74/467 |
| 5,251,725 A | * | 10/1993 | Barrett, Jr. .................... | 184/6.14 |
| 5,728,219 A | * | 3/1998 | Allen et al. ................... | 118/315 |
| 6,039,667 A | * | 3/2000 | Schunck et al. ............. | 475/159 |
| 8,707,815 B2 | * | 4/2014 | Voth et al. .................. | 74/412 R |
| 2009/0050180 A1 | * | 2/2009 | Hopkins et al. ........... | 134/22.12 |
| 2010/0018807 A1 | * | 1/2010 | Grenfeldt et al. .......... | 184/6.12 |
| 2012/0240703 A1 | * | 9/2012 | Voth et al. .................. | 74/412 R |
| 2013/0025405 A1 | * | 1/2013 | Arisawa et al. ............ | 74/606 R |

FOREIGN PATENT DOCUMENTS

| | | |
|---|---|---|
| CN | 101523086 A | 9/2009 |
| CN | 102691781 A | 9/2012 |

(Continued)

OTHER PUBLICATIONS

Japanese Patent Office, Office Action Issued in Japanese Patent Application No. 2012-279647, Oct. 13, 2015, 5 pages.

(Continued)

*Primary Examiner* — William E Dondero
*Assistant Examiner* — Mark K Buse
(74) *Attorney, Agent, or Firm* — Alleman Hall McCoy Russell & Tuttle LLP (57) ABSTRACT

A transmission lubricating structure which lubricates a transmission using a lubricating fluid, the transmission including a plurality of gear pairs each including a drive gear and a driven gear, includes a lubricating fluid feeding unit for feeding the lubricating fluid to the gears of the gear pairs; wherein the lubricating fluid feeding unit includes a plurality of injection nozzles, each of which directly injects the lubricating fluid to a tooth of the drive gear and a tooth of the driven gear, which teeth start to engage with each other.

19 Claims, 5 Drawing Sheets

(56) References Cited

FOREIGN PATENT DOCUMENTS

| JP | S57169893 U  | 10/1982 |
|----|--------------|---------|
| JP | H0377849 U   | 8/1991  |
| JP | H10252871 A  | 9/1998  |
| JP | 2007139069 A | 6/2007  |
| JP | 2008014349 A | 1/2008  |
| JP | 200924618 A  | 2/2009  |

OTHER PUBLICATIONS

State Intellectual Property Office of the People's Republic of China, Office Action and Search Report Issued in Application No. 2013105652308, Oct. 30, 2015, 9 pages. (Submitted with Translation of Search Report).

* cited by examiner

TRANSMISSION LUBRICATING STRUCTURE

BACKGROUND OF THE INVENTION

1. Field of the Invention

The present invention relates to a transmission lubricating structure mounted to a driving source such as an engine.

2. Description of the Related Art

Japanese Laid-Open Patent Application Publication No. 2009-24618 discloses a transmission including a gear pair composed of a drive gear and a driven gear. In this transmission, a lubricating fluid adhering to a crank web is scattered and fed to the gears of the gear pair, by a centrifugal force generated during rotation of the crank web. A portion of the lubricating fluid scattered by the centrifugal force adheres to a lateral wall of a crankcase. This lubricating fluid is dropped from a protrusion provided on the lateral wall and is fed to the gears of the gear pair. In this transmission, the lubricating fluid is fed to the gears of the gear pair by scattering it by the centrifugal force, or dropping it from the protrusion provided on the lateral wall. In this method, it is difficult to sufficiently feed the lubricating fluid to a tooth of the drive gear and a tooth of the driven gear, which teeth are in engagement (in mesh). Especially in a case where an engine output is great, abrasion of the gears of the gear pair tends to occur.

SUMMARY OF THE INVENTION

An object of the present invention is to provide a transmission lubricating structure which is capable of more effectively suppressing abrasion of gears of gear pairs.

According to the present invention, there is provided a transmission lubricating structure which lubricates a transmission using a lubricating fluid, the transmission including a plurality of gear pairs each including a drive gear and a driven gear, the transmission lubricating structure comprising: a lubricating fluid feeding unit for feeding the lubricating fluid to the gears of the gear pairs; wherein the lubricating fluid feeding unit includes a plurality of injection nozzles, each of which directly injects the lubricating fluid to a tooth of the drive gear and a tooth of the driven gear, which teeth start to engage with each other.

In this configuration, since the lubricating fluid is directly injected to the tooth of the drive gear and the tooth of the driven gear in the gear pair, which teeth start to engage with each other (mesh with each other), to be precise, which teeth are about to engage with each other, it can be concentratively fed to the tooth of the drive gear and the tooth of the driven gear, which teeth are in engagement, than in a case where the lubricating fluid is injected to a tooth of the drive gear and a tooth of the driven gear in the gear pair, which teeth start to disengage from each other, to be precise, which teeth are about to disengage from each other. This can prevent insufficient lubrication of the gears. That is, the lubricating fluid can be sufficiently fed to the tooth of the drive gear and the tooth of the driven gear, which teeth are in engagement. As a result, abrasion of the gears of the gear pairs can be suppressed.

The above and further objects and features of the invention will more fully be apparent from the following detailed description with reference to accompanying drawings.

DETAILED DESCRIPTION OF THE PREFERRED EMBODIMENTS

Hereinafter, a preferred embodiment of a transmission lubricating structure of the present invention will be described with reference to the drawings. The directions used hereinafter are from the perspective of a driver straddling a motorcycle, and a rightward and leftward direction corresponds with a vehicle width direction.

Figure 1:
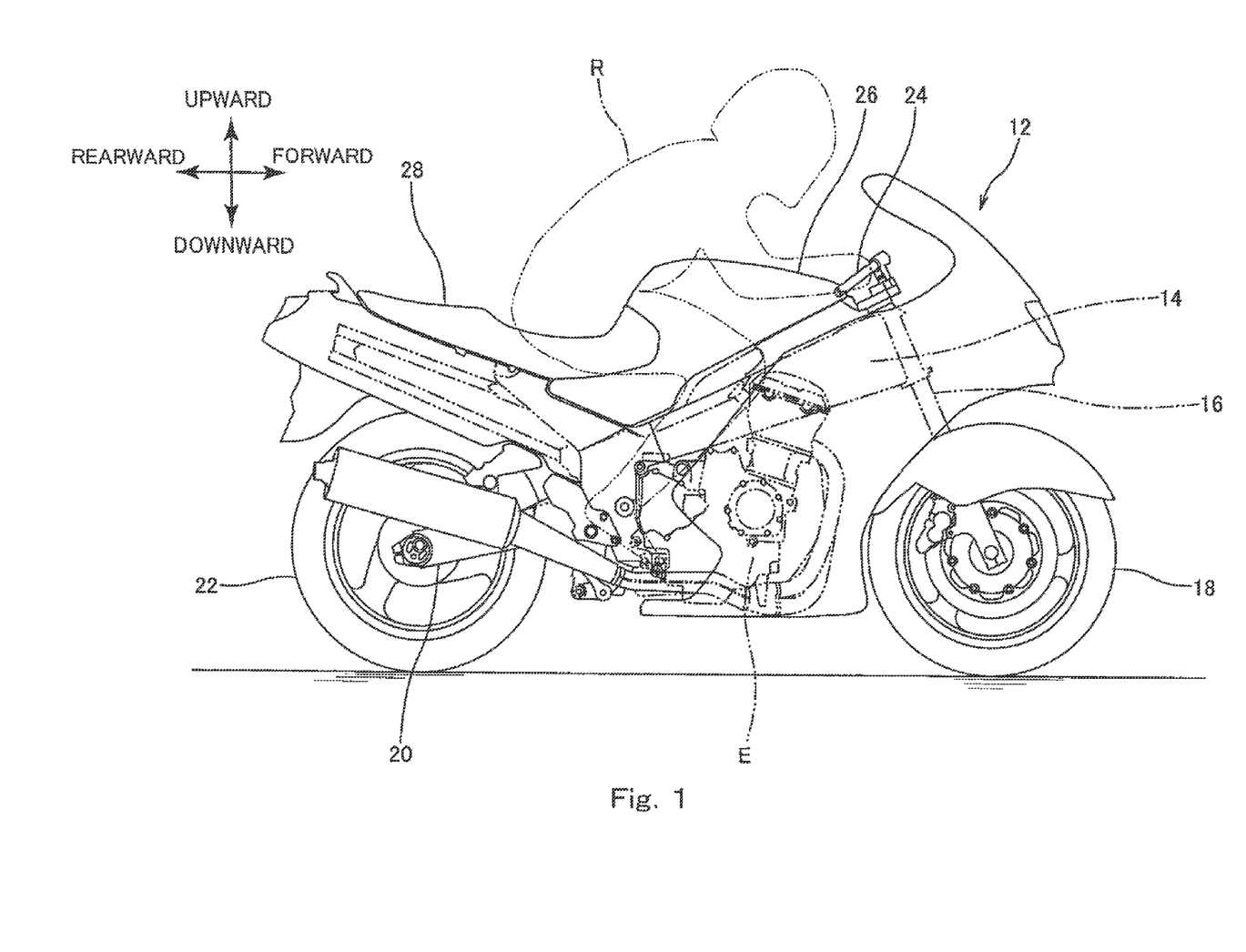
FIG. 1 is a right side view showing a configuration of a motorcycle including an engine having a transmission lubricating structure according to an embodiment.

FIG. 1 is a right side view showing a configuration of a motorcycle 12 including an engine E having a transmission lubricating structure 10 (FIG. 2) according to the embodiment. Referring to FIG. 1, the motorcycle 12 includes a vehicle body frame 14, an engine E mounted to the vehicle body frame 14, a front wheel 18 mounted on a front fork 16 at a front portion of the vehicle body frame 14, and a rear wheel 22 mounted to a swing arm 20 at a rear portion of the vehicle body frame 14. The motorcycle 12 further includes a steering handle 24 pivoted to the right or to the left by a driver R to steer the front wheel 18, a fuel tank 26 disposed behind the steering handle 24, and a seat 28 disposed behind the fuel tank 26. The engine E is disposed below the fuel tank 26. The transmission lubricating structure 10 of FIG. 2 is incorporated into the engine E.

Figure 2:
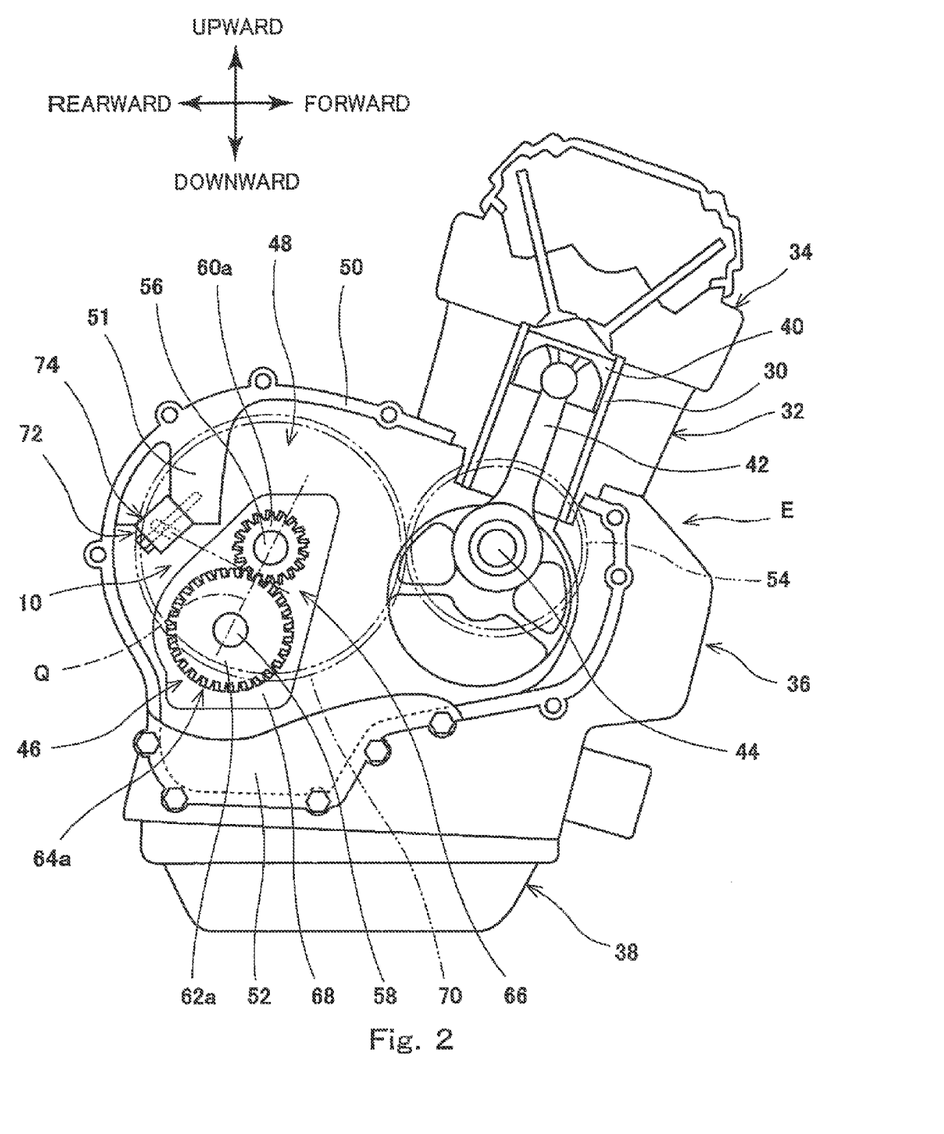
FIG. 2 is a right side view showing a configuration of the engine having the transmission lubricating structure according to the embodiment.

FIG. 2 is a right side view showing a configuration of the engine E having the transmission lubricating structure 10 according to the embodiment. Referring to FIG. 2, the engine E includes a cylinder block 32 having a cylinder 30, a cylinder head 34 coupled to an upper end portion of the cylinder block 32, a case 36 coupled to a lower end portion of the cylinder block 32, and an oil pan 38 coupled to a lower end portion of the case 36. The engine E further includes a piston 40 which slidably reciprocates inside of the cylinder 30, a crankshaft 44 coupled to the piston 40 via a connecting rod 42, a transmission 46 which changes a speed of rotational power output from the crankshaft 44, and the transmission lubricating structure 10 for feeding the lubricating fluid to the transmission 46.

Referring to FIG. 2, the case 36 includes a case body 50 having a case opening 48 in a side surface (right side surface in the present embodiment), and a lid member 52 removably attached to the case body 50 so as to close the case opening 48. The crankshaft 44, the transmission 46 and the transmission lubricating structure 10 are accommodated into the case body 50. That is, the case 36 serves as a crankcase for accommodating the crankshaft 44 and a transmission case for accommodating the transmission 46. The crankshaft 44 is disposed inside of a front portion of the case body 50 such that its rotary shaft extends in the rightward and leftward direction. A crank gear 54 is mounted on the crankshaft 44. The transmission 46 is disposed behind the crankshaft 44. The transmission lubricating structure 10 is disposed behind the transmission 46.

Figure 3:
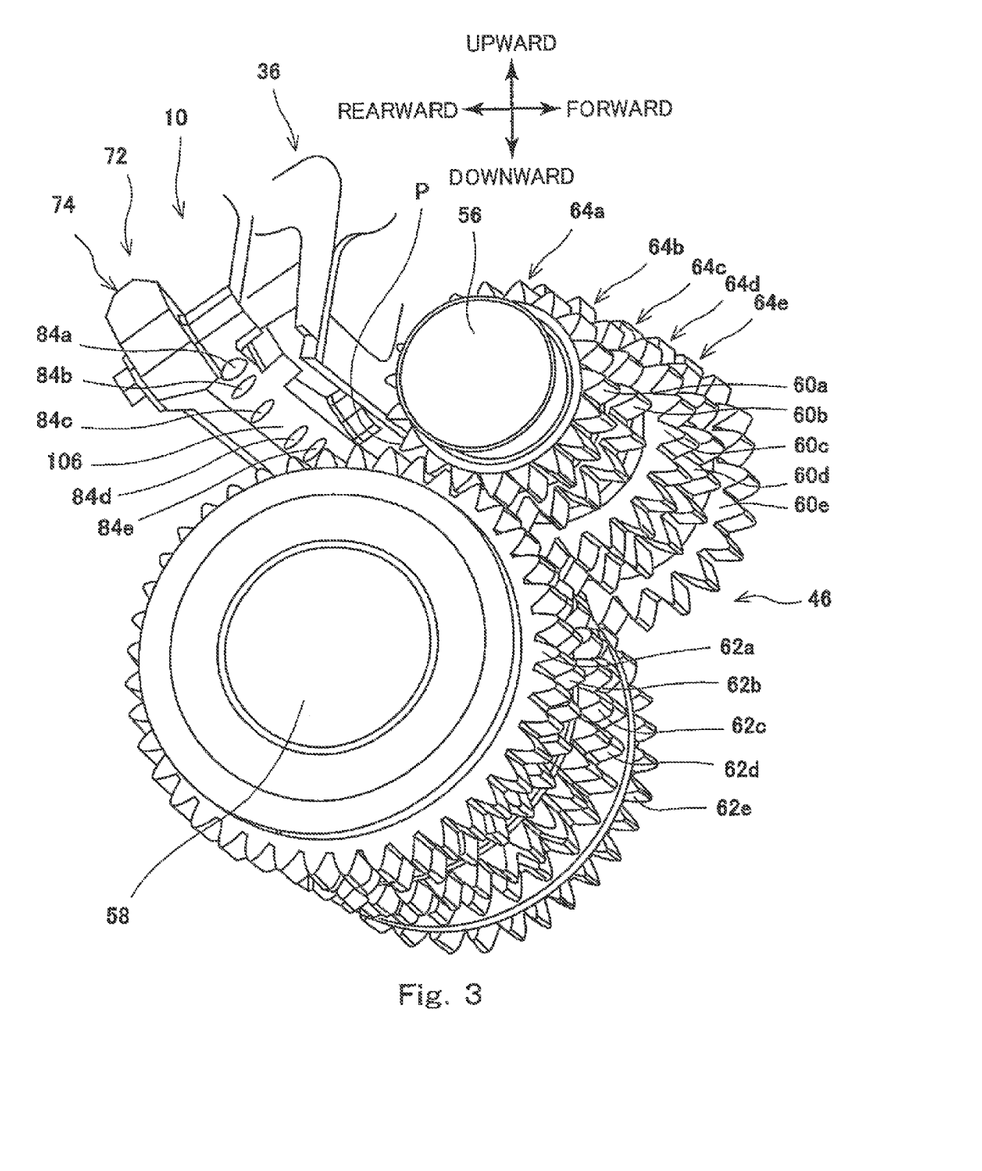
FIG. 3 is a perspective view showing a configuration of major components of the transmission lubricating structure according to the embodiment.

FIG. 3 is a perspective view showing a configuration of major components of the transmission lubricating structure 10. Referring to FIG. 3, the transmission 46 includes an input shaft member 56 extending in parallel with the crankshaft 44 (FIG. 2), an output shaft member 58 extending in parallel with the crankshaft 44, a plurality of (five in the present embodiment) drive gears 60a to 60e mounted on the input shaft member 56, and a plurality of (five in the present embodiment) driven gears 62a to 62e mounted on the output shaft member 58. The plurality of drive gears 60a to 60e are configured to engage with (mesh with) the plurality of driven gears 62a to 62e in a one-to-one correspondence, to form a plurality of (five in the present embodiment) gear pairs 64a to 64e which are different in gear ratio. The input shaft member 56 is disposed in front of and above the output shaft member 58. The drive gears 60a to 60e have smaller diameters than the corresponding driven gears 62a to 62e, respectively. This can provide a space in which a lubricating fluid feeding unit 72 is placed, behind the drive gears 60a to 60e and above the driven gears 62a to 62e. Between the driven gears 62a to 62e and the output shaft member 58, a driving power transmission mechanism (not shown) is provided to connect the driven gears 62a to 62e to the output shaft member 58 and disconnect the driven gears 62a to 62e from the output shaft member 58. This driving power transmission mechanism is configured to connect any one of the five gear pairs 64a to 64e to the output shaft member 58, and disconnect the remaining four gear pairs from the output shaft member 58.

Referring to FIG. 2, the plurality of gear pairs 64a to 64e (FIG. 3) are mounted to a base plate 68 together with the input shaft member 56 and the output shaft member 58 (i.e., shaft member of the drive gears 60a to 60e and shaft member the driven gears 62a to 62e), to construct a single gear unit 66. The gear unit 66 is removably mounted to the case body 50 of the case 36 as a cassette transmission through the case opening 48 from a direction (axial direction) in which the input shaft member 56 and the output shaft member 58 extend. In the present embodiment, the base plate 68 is fastened to the case body 50 by means of fastener members (not shown) such as bolts.

Referring to FIG. 2, a clutch gear 70 is mounted on the input shaft member 56 of the transmission 46 such that the clutch gear 70 engages with (meshes with) the crank gear 54. The rotational power of the crankshaft 44 is input to the input shaft member 56 via the crank gear 54 and the clutch gear 70. The speed of the rotational power is reduced by any one of the plurality of gear pairs 64a to 64e, and the resulting rotational power is output from the output shaft member 58 and transmitted to the rear wheel 22 (FIG. 1).

Figure 4:
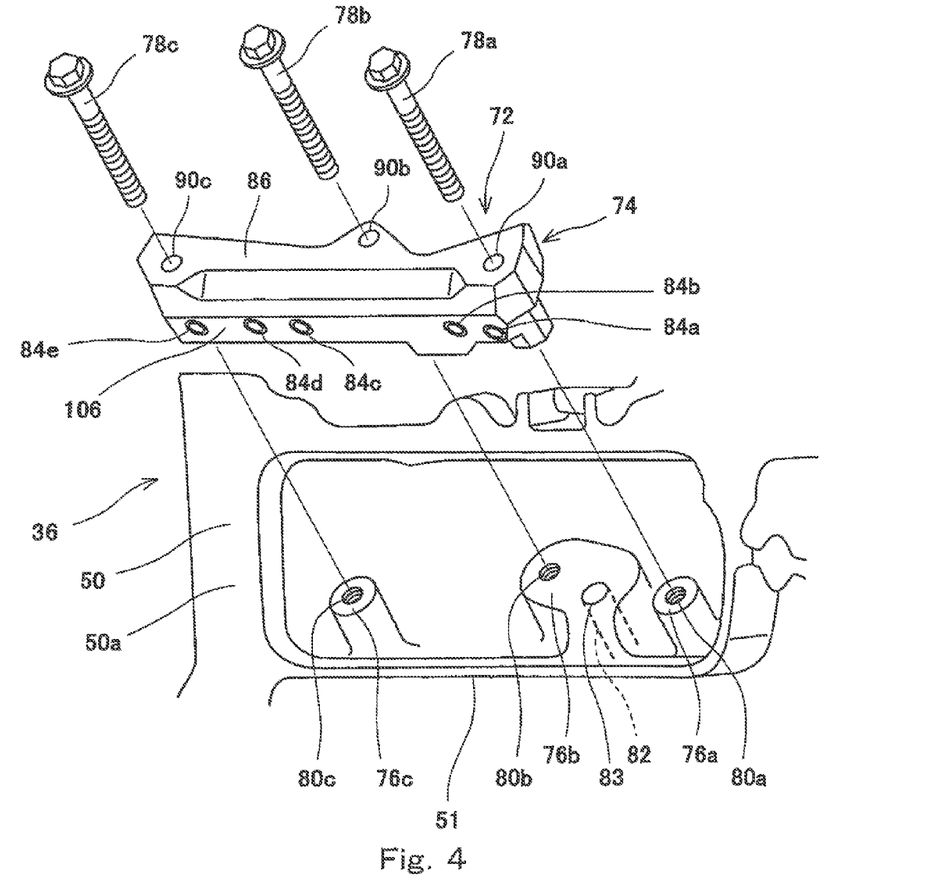
FIG. 4 is an exploded perspective view showing a mounting structure of a lubricating fluid feeding unit.

FIG. 4 is an exploded perspective view showing a mounting structure of the lubricating fluid feeding unit 72. As shown in FIG. 4, the transmission lubricating structure 10 includes the case 36 and the lubricating fluid feeding unit 72 for feeding the lubricating fluid to the gear pairs 64a to 64e (FIG. 2) inside of the case 36. As described above, the case 36 includes the case body 50 and the lid member 52 (FIG. 2). A protruding section 51 (FIG. 2) is provided on an upper surface of a rear portion of the case body 50 such that the protruding section 51 protrudes from an inner wall surface of the case body 50 toward the gear pairs 64a to 64e. The protruding section 51 serves to fasten a nozzle retaining member 74. The protruding section 51 has fastening surfaces 76a to 76c to which the nozzle retaining member 74 of the lubricating fluid feeding unit 72 is fastened. The fastening surfaces 76a to 76c are provided with female threads 80a to 80c into which bolts 78a to 78c are threaded, respectively.

A case passage 82 is formed inside of the side wall portion 50a of the case body 50 to flow the lubricating fluid therethrough. A first opening 83 at a downstream side of the case passage 82 in a flow direction of the lubricating fluid is formed in the fastening surface 76b. An opening (not shown) at an upstream side of the case passage 82 is connected to a discharge outlet of a pump (not shown) via a pipe, an oil filter, and others. In the present embodiment, to increase an injecting pressure of the lubricating fluid injected from injection nozzles 84a to 84e, the lubricating fluid is flowed to the case passage 82 without passing it through an oil cooler. Alternatively, the lubricating fluid having passed through the oil cooler and having been cooled may be flowed to the case passage 82.

Referring to FIG. 3, the lubricating fluid feeding unit 72 includes the injection nozzles 84a to 84e, each of which directly injects the lubricating fluid to a point P at which a tooth of the drive gear and a tooth of the driven gear in the corresponding gear pair, start to engage with each other, to be precise, the teeth are about to engage with each other, and the nozzle retaining member 74 for retaining the injection nozzles 84a to 84e inside of the case 36. The injection nozzles 84a to 84e are arranged in parallel with the input shaft member 56 and the output shaft member 58 such that the injection nozzles 84a to 84e correspond to the plurality of gear pairs 64a to 64e, respectively, in a one-to-one correspondence. In the present embodiment, the injection nozzles 84a to 84e are implemented by hexagonal socket set screws (not shown). More specifically, the injection nozzles 84a to 84e have tubular nozzle bodies and male threads are formed on outer peripheral surfaces of the nozzle bodies, respectively, although these are not shown. An internal space of each nozzle body defines a linear injection passage extending in the direction in which the lubricating fluid is injected. Through the injection passage, the lubricating fluid is guided linearly (like a beam).

Discharge amounts of the plurality of injection nozzles 84a to 84e of FIG. 3 are set depending on the gear ratios of the corresponding gear pairs 64a to 64e, use frequencies of the corresponding gear pairs 64a to 64e, etc. For example, the discharge amount of the injection nozzle corresponding to the gear pair which is used more frequently may be set greater than the discharge amount of the injection nozzle corresponding to the gear pair which is used less frequently. In this case, damages to the gear pair which is used more frequently can be avoided. Or, for example, the discharge amount of the injection nozzle corresponding to the gear pair of a lower speed may be set greater than the discharge amount of the injection nozzle corresponding to the gear pair of a higher speed. In this case, damages to the gear pair which transmits greater torque can be avoided. Or, the discharge amounts of the plurality of injection nozzles 84a to 84e may be adjusted by varying bore diameters of the corresponding injection passages (not shown).

An injection angle of each of the plurality of injection nozzles 84a to 84e of FIG. 3 is individually set so that the lubricating fluid is injected to the point P (FIG. 3) at which the tooth of the drive gear and the tooth of the driven gear in the corresponding gear pair, start to engage with each other. As shown in FIG. 2, at least one of the plurality of injection nozzles 84a to 84e (FIG. 3) is configured to, when a virtual plane including a center of the input shaft member 56 and a center of the output shaft member 58 is expressed as Q, inject the lubricating fluid to a point between the corresponding drive gear 60a to 60e (FIG. 3) and the corresponding driven gear 62a to 62e (FIG. 3), from a direction which is orthogonal to the virtual plane Q when viewed from the side.

Figure 5A:
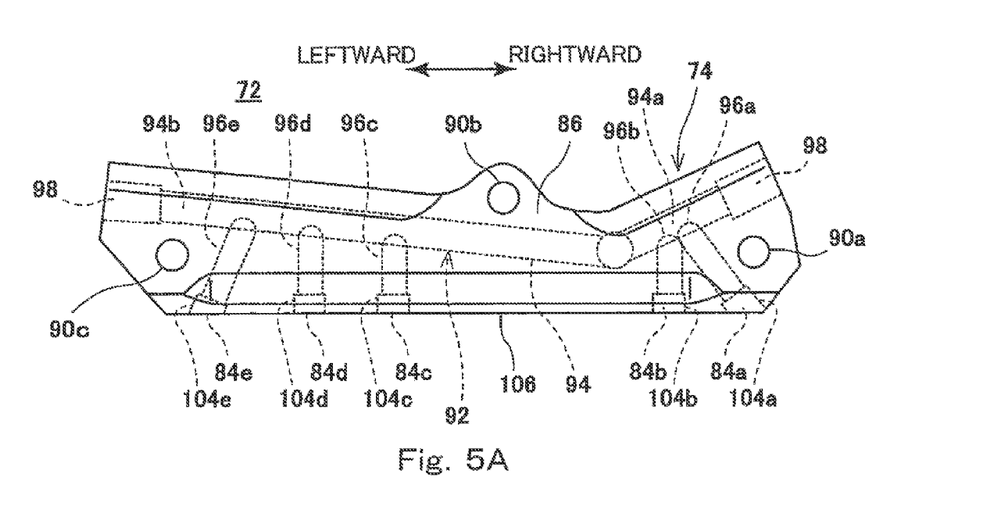
FIG. 5A is a front view showing a configuration of the lubricating fluid feeding unit.
Figure 5B:
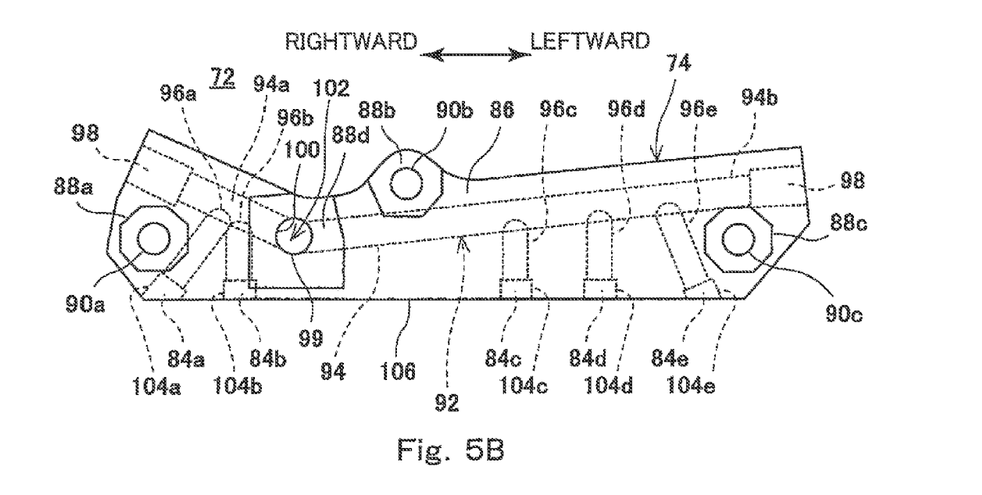
FIG. 5B is a rear view showing a configuration of the lubricating fluid feeding unit.

FIG. 5A is a front view showing a configuration of the lubricating fluid feeding unit 72. FIG. 5B is a rear view showing a configuration of the lubricating fluid feeding unit 72. In the present embodiment, the front view shows the lubricating fluid feeding unit 72 in a state of FIG. 3, which is viewed from rearward and downward, while the rear view shows the lubricating fluid feeding unit 72 in a state of FIG. 3, which is viewed from forward and above. As shown in FIG. 5B, the nozzle retaining member 74 includes a retaining member body 86 extending in the rightward and leftward direction. A back surface of the retaining member body 86 has at least one fastened surface, in the present embodiment, four fastened surfaces 88a to 88d to be fastened to the fastening surfaces 76a to 76c (FIG. 4) of the case 36 (FIG. 4). The fastened surfaces 88a to 88c are provided with through-holes 90a to 90c, respectively, penetrating the retaining member body 86. Bolts 78a to 78c (FIG. 4) are inserted into the through-holes 90a to 90c, respectively.

As shown in FIGS. 5A and 5B, a nozzle passage 92 is formed inside of the retaining member body 86 to flow the lubricating fluid therethrough. The nozzle passage 92 includes a main passage 94 extending over substantially the entire length of the retaining member body 86 such that the main passage 94 extends substantially in parallel with the input shaft member 56 and the output shaft member 58 (FIG. 3), and a plurality of (in the present embodiment five) branch passages 96a to 96e extending forward and downward from the main passage 94. Sealing members 98 are fitted to right and left ends of the main passage 94, respectively, to prevent a leakage of the lubricating fluid. The fastened surface 88d of FIG. 5B is provided with a second opening 99 at an upstream side of the nozzle passage 92 in the flow direction of the lubricating fluid. An introduction passage 100 extends from the second opening 99 toward the main passage 94. The introduction passage 100 is communicated with the main passage 94 via a branch section 102.

As shown in FIGS. 5A and 5B, a downstream end portion of the nozzle passage 92, i.e., downstream end portions of the branch passages 96a to 96e are provided with insertion holes 104a to 104e into which the injection nozzles 84a to 84e are inserted, respectively. Female threads are formed on inner peripheral surfaces of the insertion holes 104a to 104e, respectively. The male threads of the plurality of injection nozzles 84a to 84e are threadingly engaged with the female threads, respectively. A side surface of the retaining member body 86 on which the plurality of injection nozzles 84a to 84e are arranged is a nozzle surface 106.

As shown in FIGS. 5A and 5B, the main passage 94 includes a first inclined section 94a formed to be closer to the nozzle surface 106 from a right end surface of the retaining member body 86 toward the branch section 102, and a second inclined section 94b formed to be closer to the nozzle surface 106 from a left end surface of the retaining member body 86 toward the branch section 102. The injection directions of the three injection nozzles 84b to 84d, among the plurality of injection nozzles 84a to 84e, are set to be orthogonal to the nozzle surface 106. The injection direction of the rightmost injection nozzle 84a is set to be inclined to the right with respect to the direction orthogonal to the nozzle surface 106. The injection direction of the leftmost injection nozzle 84e is set to be inclined to the left with respect to the direction orthogonal to the nozzle surface 106. When the lubricating fluid feeding unit 72 is viewed from the nozzle surface 106, the rightmost injection nozzle 84a is placed so as to overlap with the through-hole 90a, while the leftmost injection nozzle 84e is placed so as to overlap with the through-hole 90c.

As shown in FIG. 4, when the lubricating fluid feeding unit 72 is mounted to the interior of the case 36, the fastened surfaces 88a to 88d of the nozzle retaining member 74 of FIG. 5B are brought into contact with the fastening surfaces 76a to 76c of the case 36, respectively. Then, the bolts 78a to 78c are inserted into the through-holes 90a to 90c of the nozzle retaining member 74, respectively, and are threadingly engaged with the female threads 80a to 80c, respectively. In a state in which the fastened surface 88d (FIG. 5B) is fastened to the fastening surface 76b, the second opening 99 (FIG. 5B) at an upstream side of the nozzle passage 92 is communicated with the first opening 83 at a downstream side of the case passage 82. In this state, since the fastened surface 88d (FIG. 5B) is fitted to the fastening surface 76b, the lubricating fluid does not leak from a region in the vicinity of the second opening 99 (FIG. 5B) and the first opening 83. In a case where one or more of the plurality of gear pairs 64a to 64e is changed into another gear pair which is different in gear ratio, or the gear unit 66 is changed into another gear unit which is different in gear ratio, the lubricating fluid feeding unit 72 is changed together.

[Advantages of Embodiment]

In accordance with the present embodiment, with the above configuration, the following advantages can be achieved. As shown in FIG. 3, since the lubricating fluid is directly injected to the point P at which the tooth of the drive gear and the tooth of the driven gear in the gear pair start to engage with each other (mesh with each other), it can be more concentratively fed to the teeth in engagement, than in a case where the lubricating fluid is injected to the tooth of the drive gear and the tooth of the driven gear, which start to disengage from each other. This makes it possible to prevent insufficient lubrication of the gears.

Since each of the plurality of injection nozzles 84a to 84e of FIG. 3 injects the lubricating fluid linearly (like a beam), the lubricating fluid can be injected in a pinpoint manner to the point P at which the tooth of the drive gear and the tooth of the driven gear start to engage with each other. This makes it possible to sufficiently lubricate the teeth in engagement, with a small amount of lubricating fluid. As a result, a volume of the lubricating fluid does not increase, and hence the motorcycle 12 can be reduced in weight.

Since the plurality of injection nozzles 84a to 84e inject the lubricating fluid, a spacing between the lubricating fluid feeding unit 72 and the gear pairs 64a to 64e can be increased. Therefore, the lubricating fluid feeding unit 72 can be placed more flexibly. In a case where the lubricating fluid is dropped by its own weight like the conventional lubricating structure, it is difficult to guide the lubricating fluid to the teeth in engagement, if the input shaft member 56 and the output shaft member 58 are arranged at upper and lower sides. By comparison, in the present embodiment, the plurality of injection nozzles 84a to 84e inject the lubricating fluid. Therefore, even in a case where the input shaft member 56 and the output shaft member 58 are arranged at upper and lower sides, or the teeth in engagement are invisible because of the presence of the gears located thereabove, when viewed from above, the lubricating fluid can be suitably guided to the teeth in engagement. In other words, the gears can be suitably lubricated, irrespective of layout of shaft members and shape of the gears.

As shown in FIG. 3, since the plurality of injection nozzles 84a to 84e are provided to correspond to the plurality of gear pairs 64a to 64e, respectively, in a one-toone correspondence, sizes and orientations of the plurality of injection nozzles 84a to 84e can be individually selected or set to be adapted to the corresponding gear pairs 64a to 64e, respectively.

As shown in FIG. 3, since the lubricating fluid feeding unit 72 is placed behind the drive gears 60a to 60e and above the driven gears 62a to 62e, the lubricating fluid feeding unit 72 can be placed inside of the case 36 while achieving space saving. In addition, since the plurality of injection nozzles 84a to 84e are configured to inject the lubricating fluid in a downward direction from above, the lubricating fluid can be guided to a distant point.

As shown in FIG. 4, by fastening the fastened surfaces 88a to 88d (FIG. 5B) of the nozzle retaining member 74 to the fastening surfaces 76a to 76c of the case 36, respectively, the injection directions of the plurality of injection nozzles 84a to 84e are determined. Thus, the injection directions of the plurality of injection nozzles 84a to 84e can be set accurately by accurately forming the fastened surfaces 88a to 88d (FIG. 5B) and the fastening surfaces 76a to 76c, and hence non-uniformity of the injection directions can be lessened.

As shown in FIG. 4, it becomes possible to simultaneously perform the operation for fastening the fastened surfaces 88a to 88d (FIG. 5B) to the fastening surfaces 76a to 76c and the operation for communicating the second opening 99 at an upstream side of the nozzle passage 92 with the first opening 83 at a downstream side of the case passage 82. In this way, these operations can be performed easily.

As shown in FIG. 4, since the fastened surface 88d (FIG. 5B) is fitted to the fastening surface 76b, it becomes possible to prevent the lubricating fluid from leaking from a region in the vicinity of the first opening 83 and the second opening 99. Since the direction in which the bolts 78a to 78c are threadingly inserted into the through-holes 90a to 90c, respectively, conforms to the direction in which the first opening 83 and the second opening 99 are connected to each other, the first opening 83 and the second opening 99 can be firmly connected to each other, which makes it possible to more effectively prevent the lubricating fluid from leaking from a region in the vicinity of the first opening 83 and the second opening 99. Moreover, since the case passage 82 is formed inside of the side wall portion 50a of the case body 50, leakage of the lubricating fluid can be prevented and the number of components can be reduced as compared to a case where a hose is provided separately.

As shown in FIGS. 5A and 5B, since the injection angle of each of the plurality of injection nozzles 84a to 84e is individually set so that the lubricating fluid is injected to the point P (FIG. 3) at which the tooth of the drive gear and the tooth of the driven gear start to engage with each other, it becomes possible to efficiently inject the lubricating fluid to the teeth in engagement.

As shown in FIGS. 5A and 5B, the injection direction of the rightmost injection nozzle 84a is set to be inclined to the right with respect to the direction which is orthogonal to the nozzle surface 106, while the injection direction of the leftmost injection nozzle 84e is set to be inclined to the left with respect to the direction which is orthogonal to the nozzle surface 106. This allows the lubricating fluid to be injected to a region longer than a length of the main passage 94. As a result, a size of the retaining member body 86 can be reduced.

As shown in FIGS. 5A and 5B, when the lubricating fluid feeding unit 72 is viewed from the nozzle surface 106, the injection nozzles 84a and 84e are disposed so as to overlap with the through-holes 90a and 90c, respectively. Therefore, the size of the retaining member body 86 can be reduced as compared to a case where the injection nozzles 84a and 84e are disposed so as not to overlap with the through-holes 90a and 90c, respectively.

As shown in FIGS. 5A and 5B, the injection nozzles 84a to 84e are disposed on the nozzle surface 106 of the retaining member body 86, and the nozzle passage 92 is formed inside of the retaining member body 86. Therefore, a member defining the nozzle passage 92 is not disclosed between the nozzle surface 106 and the gear pairs 64a to 64e, and a distance between each of the injection nozzles 84a to 84e and the corresponding one of the gear pairs 64a to 64e, can be reduced.

As shown in FIG. 2, at least one of the plurality of injection nozzles 84a to 84e (FIG. 3) is configured to inject the lubricating fluid, from the direction which is orthogonal to the virtual plane Q, when viewed from the side, the virtual plane Q including the center of the input shaft member 56 and the center of the output shaft member 58. Therefore, at least one of the plurality of injection nozzles 84a to 84e is able to accurately inject the lubricating fluid in a pinpoint manner to a particular point between the drive gear and the driven gear, from their tangential direction.

As shown in FIG. 2, the gear unit 66 is removably mounted to the case body 50 of the case 36 through the case opening 48 from the direction (axial direction of the input shaft member 56 and the output shaft member 58) in which the input shaft member 56 and the output shaft member 58 extend. Therefore, the lubricating fluid feeding unit 72 can be removably mounted to the interior of the case 36, with the gear unit 66 detached from the case body 50. Thus, maintenance can be easily carried out.

As shown in FIG. 2, the protruding section 51 is formed on the upper surface of the rear portion of the case body 50 such that the protruding section 51 protrudes from the inner wall surface of the case body 50 toward the gear pairs 64a to 64e. The nozzle retaining member 74 is fastened to the protruding section 51. This makes it possible to avoid an increase in the size of the nozzle retaining member 74 and suppress its mounting stiffness. Thus, the number of bolts 78a to 78c can be lessened.

As shown in FIG. 2, the lubricating fluid feeding unit 72 is provided on the wall of the case 36 which is at an opposite side of the cylinder block 32 with respect to the gear pairs 64a to 64e. In other words, the lubricating fluid feeding unit 72 and the cylinder block 32 are at opposite sides with respect to the gear pairs 64a to 64e. This makes it possible to avoid interference between the lubricating fluid feeding unit 72 and engine-related components (not shown) such as a balancer or a starter motor. As a result, flexibility of design of the components can be improved.

[Alternative Example]

The case body 50 of the case 36 of FIG. 2 may be dividable into a first section and a second section. In this case, a passage of the lubricating fluid may be formed in such a manner that a first contact surface of the first section is provided with a groove, a second contact surface of the second section is made flat, and the second contact surface closes an opening of the groove. In this way, the passage of the lubricating fluid can be formed in the case body 50 easily and accurately.

The injection nozzles 84a to 84e of FIG. 3 may be configured to inject the lubricating fluid to either the drive gears 60a to 60e or the driven gears 62a to 62e forming the gear pairs 64a to 64e, which have a smaller diameter. In this configuration, since the injection nozzles 84a to 84e inject the lubricating fluid to the gears having a smaller diameter, i.e., gears which rotate at a higher speed, scattering of the lubricating fluid can be facilitated so that the lubricating fluid is easily fed to the entirety of the teeth of the gears, which engage with each other.

The injection nozzles 84a to 84e of FIG. 3 may be configured to inject the lubricating fluid to either the drive gears 60a to 60e or the driven gears 62a to 62e forming the gear pairs 64a to 64e, which have a greater diameter. In this configuration, since scattering of the lubricating fluid can be suppressed, the lubricating fluid can be concentratively fed to the teeth in engagement.

The injection directions of the injection nozzles 84a to 84e of FIG. 3 may be set to be different from each other so that the lubricating fluid flies toward the teeth of the gears of the gear pairs 64a to 64e, which teeth engage with each other. For example, the injection direction for one of the driven gears 62a to 62e, having a greater diameter, may be set to be closer to the input shaft member 56, than the injection direction for another one of the driven gears 62a to 62e, having a smaller diameter. Or, the injection direction for one of the driven gears 62a to 62e, having a smaller diameter, may be set to be closer to the output shaft member 58, than the injection direction for another one of the driven gears 62a to 62e, having a greater diameter. In other words, the injection direction of the injection nozzle corresponding to the gear pair having a higher reduction gear ratio may be set to be closer to the input shaft member 56 than the injection direction of the injection nozzle corresponding to the gear pair having a lower reduction gear ratio.

The position at which the lubricating fluid feeding unit 72 of FIG. 3 injects the lubricating fluid, i.e., the positions of the injection nozzles 84a to 84e, need not be behind the transmission 46. That is, in a case where the teeth of the gears of the gear pairs 64a to 64e are configured to start to engage with each other, at a forward side, the plurality of injection nozzles 84a to 84e may be positioned forward of the transmission 46. Or, in a case where the drive gears 60a to 60e and the driven gears 62a to 62e are arranged backward and forward, and the teeth of the gears of the gear pairs 64a to 64e are configured to start to engage with each other, at an upper or lower side, the plurality of injection nozzles 84a to 84e may be positioned above (or below) the transmission 46.

The injection nozzles 84a to 84e of FIG. 3 may be removably attached to the nozzle retaining member 74. In this configuration, in a case where the drive gears 60a to 60e and the driven gears 62a to 62e are changed to adjust the gear ratio, or the like, the lubricating fluid can be injected to a proper point by changing the injection nozzles 84a to 84e.

Although the injection nozzles 84a to 84e of FIG. 3 are configured to inject the lubricating fluid linearly (like a beam), they may be configured to inject the lubricating fluid in a dispersing manner (spray the lubricating fluid). In this case, the lubricating fluid can be injected to a wider region. The injection nozzles 84a to 84e may be formed integrally with a member which replaces the nozzle retaining member 74 or the case 36. In this case, the number of components can be reduced, and manufacturing cost can be reduced. Although the transmission 46 of FIG. 3 includes the plurality of gear pairs 64a to 64e, it may include one gear pair.

A connecting portion at which the first opening 83 of FIG. 4 and the second opening 99 of FIG. 5B are connected to each other may be provided with an O-ring. In this structure, a leakage of the lubricating fluid can be prevented more surely. Although the case passage 82 of FIG. 4 is formed inside of the side wall portion 50a of the case 36, at least a portion of the case passage 82 may be formed of a pipe (tubular) member (hose or the like) and placed outside of the case 36.

The transmission lubricating structure of the present invention is especially suitably applicable to engines in which gears tend to be applied with a load, for example, a high displacement engine of 250 cc displacement or more, a high rotational speed engine which outputs greater torque in a high engine speed range, or a supercharging engine. For example, the transmission lubricating structure of the present invention is especially suitably applicable to engines mounted in leisure vehicles such as a motorcycle which has a high acceleration performance.

The transmission lubricating structure of the present invention is also applicable to vehicles incorporating internal combustion engines, other than a diesel vehicle or a gasoline vehicle such as an ethanol vehicle. Or, the transmission lubricating structure of the present invention is applicable to a vehicle incorporating an electric motor as a driving source for driving a drive wheel. Or, the transmission lubricating structure of the present invention is also applicable to a three-wheeled vehicle, a four-wheeled vehicle, etc., as well as the motorcycle.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A transmission lubricating structure which lubricates a transmission using a lubricating fluid, the transmission including a plurality of gear pairs each including a drive gear and a driven gear, and shaft members of the drive gear and the driven gear, the transmission lubricating structure comprising:
   a lubricating fluid feeding unit for feeding the lubricating fluid to the gears of the gear pairs; and
   a case for accommodating the plurality of gear pairs;
   wherein the lubricating fluid feeding unit includes a plurality of injection nozzles, each of which directly injects the lubricating fluid to a tooth of the drive gear and a tooth of the driven gear, which teeth start to engage with each other;
   wherein the lubricating fluid feeding unit has a fastened surface fastened to a fastening surface provided on the case;
   wherein the fastening surface is provided with a case passage through which the lubricating fluid guided to the lubricating fluid feeding unit flows;
   wherein the fastened surface is provided with a nozzle passage through which the lubricating fluid flows, the nozzle passage being connected to the case passage; and
   wherein the fastening surface is located inward in an axial direction of the shaft members relative to a side wall surface of an inner wall surface of the case, the side wall surface facing the shaft members in the axial direction.

2. The transmission lubricating structure according to claim 1,
   wherein the plurality of injection nozzles are provided to correspond to the plurality of gear pairs, respectively, in a one-to-one correspondence.

3. The transmission lubricating structure according to claim 2,
wherein an injection angle of each of the plurality of injection nozzles is individually set such that the lubricating fluid is injected to the tooth of the drive gear and the tooth of the driven gear in a corresponding gear pair, which teeth start to engage with each other.

4. The transmission lubricating structure according to claim 2, wherein a discharge amount of the injection nozzle corresponding to a gear pair which is used more frequently is set greater than a discharge amount of the injection nozzle corresponding to a gear pair which is used less frequently, by varying bore diameters of the injection nozzles.

5. The transmission lubricating structure according to claim 2, wherein a discharge amount of the injection nozzle corresponding to a gear pair of a lower speed is set greater than a discharge amount of the injection nozzle corresponding to a gear pair of a higher speed, by varying bore diameters of the injection nozzles.

6. The transmission lubricating structure according to claim 1,
wherein the lubricating fluid feeding unit includes a nozzle retaining member for retaining the injection nozzles inside of the case; and
wherein the nozzle retaining member has insertion holes into which the injection nozzles are inserted, respectively, and the fastened surface.

7. The transmission lubricating structure according to claim 6,
wherein a first opening at a downstream side of the case passage in a flow direction of the lubricating fluid is formed in the fastening surface; and
wherein a second opening at an upstream side of the nozzle passage in the flow direction of the lubricating fluid is formed in the fastened surface such that the second opening is communicated with the first opening.

8. The transmission lubricating structure according to claim 6,
wherein the case includes a case body having a case opening and a lid member removably attached to the case body such that the lid member closes the case opening;
wherein the plurality of gear pairs, a shaft member of the drive gears and a shaft member of the driven gears constitute a gear unit; and
wherein the gear unit is removably mounted to the case body through the case opening from axial direction of the shaft members.

9. The transmission lubricating structure according to claim 1, wherein the fastened surface is fastened to the fastening surface in a direction which conforms to a direction in which the lubricating fluid is guided from the case to the lubricating fluid feeding unit.

10. The transmission lubricating structure according to claim 1, wherein the plurality of injection nozzles have bore diameters which are different from each other.

11. The transmission lubricating structure according to claim 1,
wherein the fastening surface is a part of a plurality of fastening surfaces, and the fastened surface is a part of a plurality of fastened surfaces,
the transmission lubricating structure further comprising:
a plurality of bolts used to fasten the fastened surfaces of the lubricating fluid feeding unit to the fastening surfaces of the case, respectively,
wherein the plurality of injection nozzles and the plurality of bolts are arranged in the axial direction of the shaft members.

12. The transmission lubricating structure according to claim 1,
wherein the nozzle passage includes a main passage extending substantially in parallel with the axial direction of the shaft members, a plurality of branch passages branching from the main passage and connected to the injection nozzles, respectively, and an introduction passage connecting the case passage to the main passage.

13. The transmission lubricating structure according to claim 1,
wherein the fastening surface is a part of a plurality of fastening surfaces, and the fastened surface is a part of a plurality of fastened surfaces,
the transmission lubricating structure further comprising:
a plurality of bolts used to fasten the fastened surfaces of the lubricating fluid feeding unit to the fastening surfaces of the case, respectively,
wherein the nozzle passage includes a main passage extending substantially in parallel with the axial direction of the shaft members, a plurality of branch passages branching from the main passage and connected to the injection nozzles, respectively, and an introduction passage connecting the case passage to the main passage, and
wherein the plurality of bolts are arranged in the axial direction of the shaft members.

14. The transmission lubricating structure according to claim 1,
wherein the fastening surface is provided on a protruding section of the case, the protruding section protruding toward the gear pairs.

15. The transmission lubricating structure according to claim 1,
wherein the transmission is disposed behind a crankshaft accommodated in a front portion of the case, and
wherein the fastening surface is provided on a rear portion of the case.

16. The transmission lubricating structure according to claim 1,
wherein the case includes a case body, and a lid member removably attached to the case body, and
wherein the fastening surface is provided on the case body.

17. The transmission lubricating structure according to claim 1,
wherein an injection direction of at least one of the plurality of injection nozzles is set to be inclined with respect to the axial direction of the shaft members.

18. A transmission lubricating structure which lubricates a transmission using a lubricating fluid, the transmission including a plurality of gear pairs each including a drive gear and a driven gear, and shaft members of the drive gear and the driven gear, the transmission lubricating structure comprising:
a lubricating fluid feeding unit for feeding the lubricating fluid to the gears of the gear pairs; and
a case for accommodating the plurality of gear pairs;
wherein the lubricating fluid feeding unit includes a plurality of injection nozzles, each of which directly injects the lubricating fluid to a tooth of the drive gear and a tooth of the driven gear, which teeth start to engage with each other, and a nozzle retaining member for retaining the plurality of injection nozzles, inside the case;

wherein the nozzle retaining member includes a retaining member body having a nozzle surface on which the plurality of injection nozzles are arranged substantially in parallel with an axial direction of each of the shaft members, and a nozzle passage including a main passage extending over a substantially entire length of the retaining member body;

wherein an injection direction of the injection nozzle placed at an endmost portion of one side in the axial direction is set to be inclined to the endmost portion of one side with respect to a direction orthogonal to the nozzle surface, and the injection direction of the injection nozzle placed at an endmost portion of an opposite side in the axial direction is set to be inclined to the endmost portion of the opposite side with respect to the direction orthogonal to the nozzle surface; and wherein a region to which the lubricating fluid is injected through the plurality of injection nozzles is longer than a length of the main passage.

19. A transmission lubricating structure which lubricates a transmission using a lubricating fluid, the transmission including a plurality of gear pairs each including a drive gear and a driven gear, and shaft members of the drive gear and the driven gear, the transmission lubricating structure comprising:

a lubricating fluid feeding unit for feeding the lubricating fluid to the gears of the gear pairs; and a case for accommodating the plurality of gear pairs;

wherein the lubricating fluid feeding unit includes a plurality of injection nozzles, each of which directly injects the lubricating fluid to a tooth of the drive gear and a tooth of the driven gear, which teeth start to engage with each other, wherein the lubricating fluid feeding unit has a fastened surface fastened to a fastening surface provided on the case, wherein the fastening surface is provided with a case passage through which the lubricating fluid guided to the lubricating fluid feeding unit flows, wherein the fastened surface is provided with a nozzle passage through which the lubricating fluid flows, the nozzle passage being connected to the case passage, wherein the nozzle passage includes a main passage extending substantially in parallel with an axial direction of the shaft members, a plurality of branch passages branching from the main passage and connected to the injection nozzles, respectively, and an introduction passage connecting the case passage to the main passage, and wherein the fastening surface extends along the axial direction of the shaft members.

* * * * *